United States Patent
Kwon et al.

(10) Patent No.: US 7,738,418 B2
(45) Date of Patent: Jun. 15, 2010

(54) METHOD FOR TRANSMITTING CONTROL SIGNAL

(75) Inventors: Yeong Hyeon Kwon, Anyang-si (KR); Seung Hee Han, Anyang-si (KR); Hyun Hwa Park, Anyang-si (KR); Dong Cheol Kim, Anyang-si (KR); Jin Sam Kwak, Anyang-si (KR); Hyun Woo Lee, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/311,564

(22) PCT Filed: Oct. 18, 2007

(86) PCT No.: PCT/KR2007/005104

§ 371 (c)(1),
(2), (4) Date: Apr. 3, 2009

(87) PCT Pub. No.: WO2008/048055

PCT Pub. Date: Apr. 24, 2008

(65) Prior Publication Data

US 2010/0027409 A1   Feb. 4, 2010

Related U.S. Application Data

(60) Provisional application No. 60/862,152, filed on Oct. 19, 2006.

(30) Foreign Application Priority Data

Jul. 11, 2007   (KR)   .................. 10-2007-0069415

(51) Int. Cl.
H04W 4/00   (2009.01)
(52) U.S. Cl. .................................... 370/328
(58) Field of Classification Search ................ None
See application file for complete search history.

(56) References Cited

U.S. PATENT DOCUMENTS

| 5,933,418 | A | * | 8/1999 | Massingill et al. ......... 370/321 |
| 2004/0081123 | A1 | | 4/2004 | Krishnan et al. |
| 2004/0127226 | A1 | | 7/2004 | Dugad et al. |
| 2008/0316959 | A1 | * | 12/2008 | Bachl et al. ................. 370/329 |
| 2009/0022173 | A1 | * | 1/2009 | Horn et al. .................. 370/460 |

FOREIGN PATENT DOCUMENTS

WO   WO 2006/104353 A2   10/2006

* cited by examiner

*Primary Examiner*—Anh-Vu Ly
(74) *Attorney, Agent, or Firm*—McKenna Long & Aldridge LLP

(57) ABSTRACT

There is provided a method of enabling a user equipment to transmit a control signal to a base station. The method includes allocating a control signal to a control region on a subframe, the subframe comprising the control region for the control signal and a data region for user data, wherein different frequency bands within the control region are allocated to different user equipments, and transmitting the subframe in uplink direction. A control signal can be robustly transmitted under variance of channel condition.

34 Claims, 11 Drawing Sheets

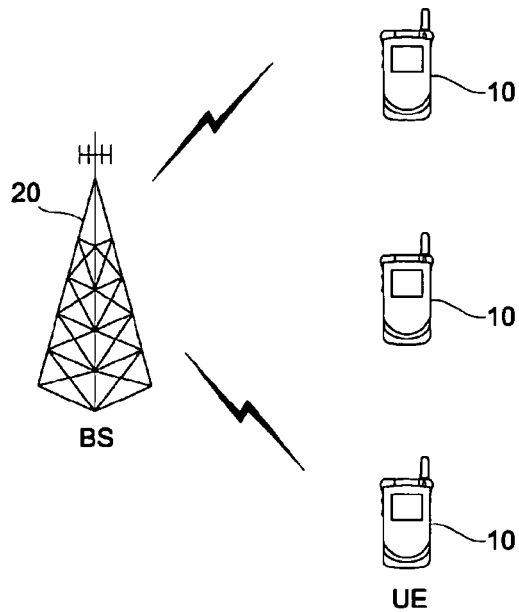
[Fig. 1]
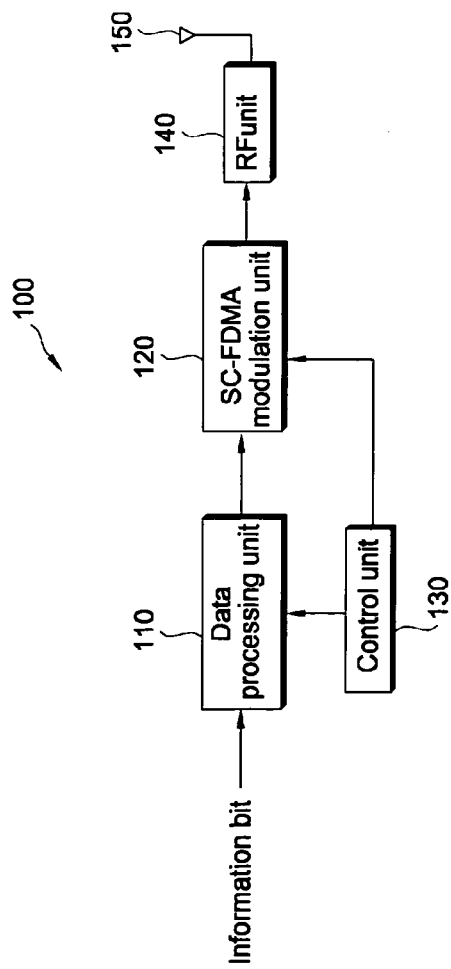
[Fig. 2]

[Fig. 3]
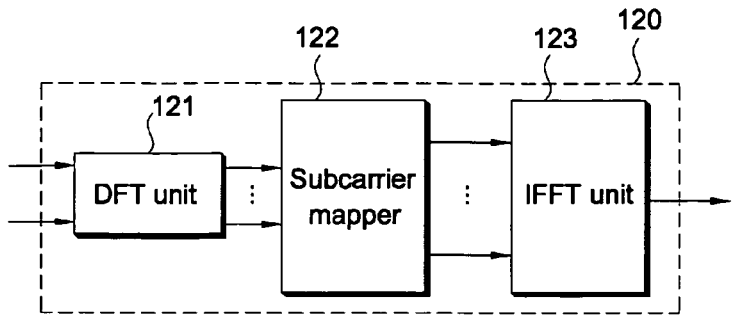
[Fig. 4]
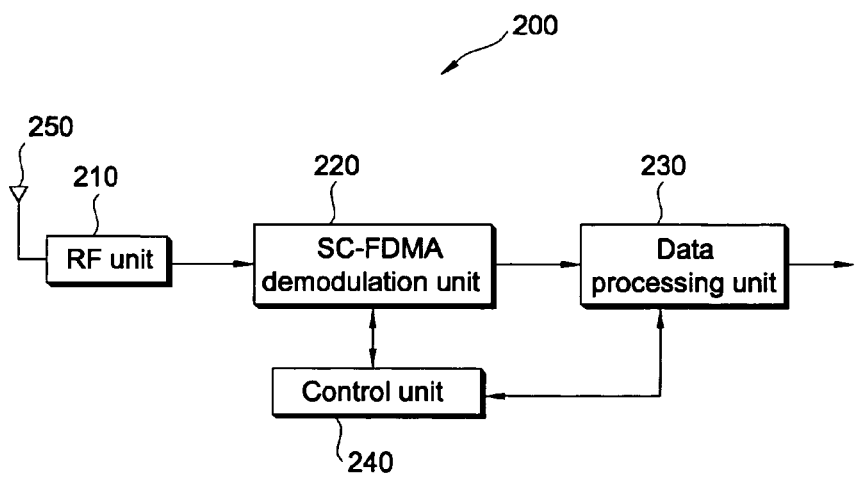
[Fig. 5]
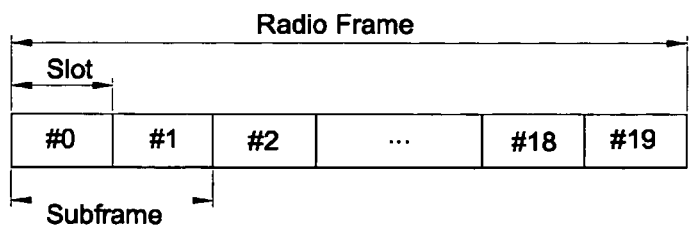
[Fig. 6]
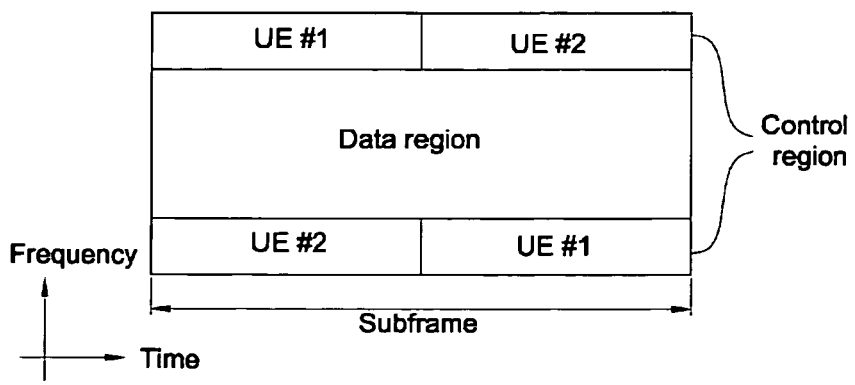

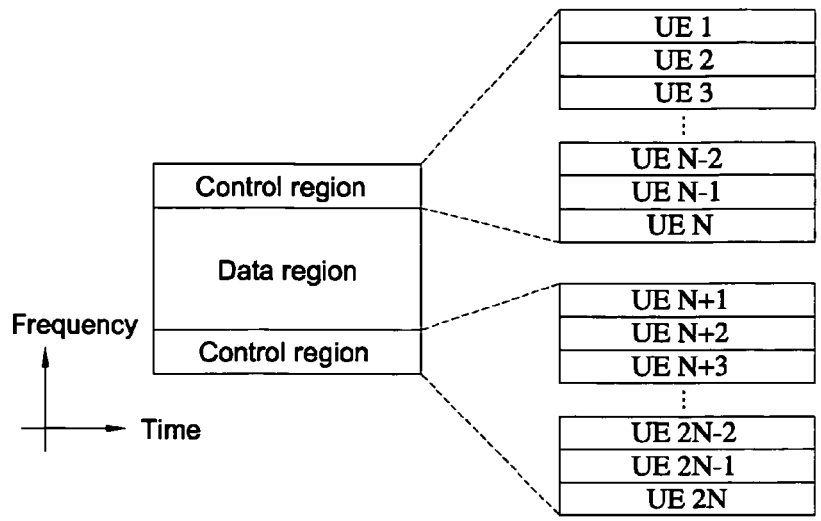
[Fig. 7]
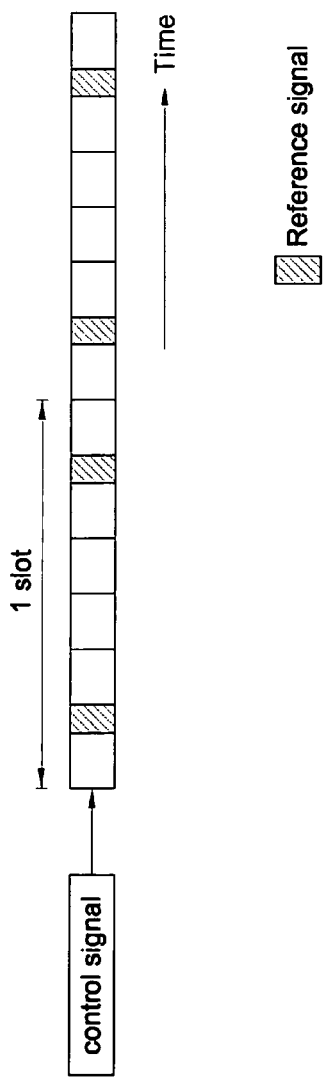
[Fig. 8]

[Fig. 9]
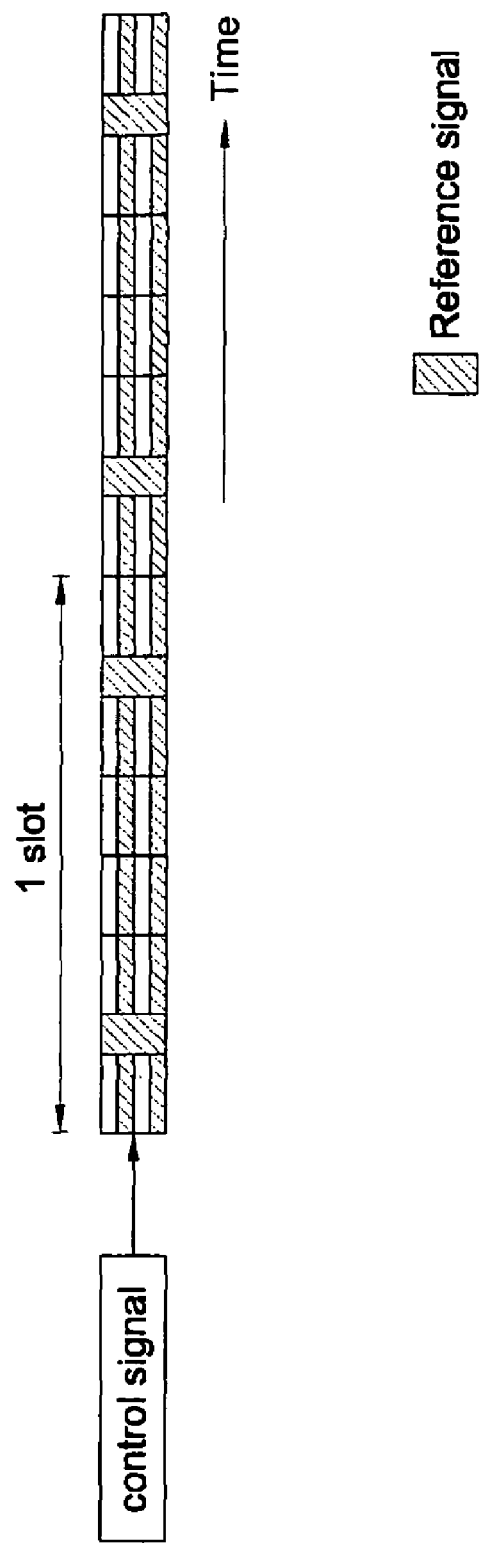

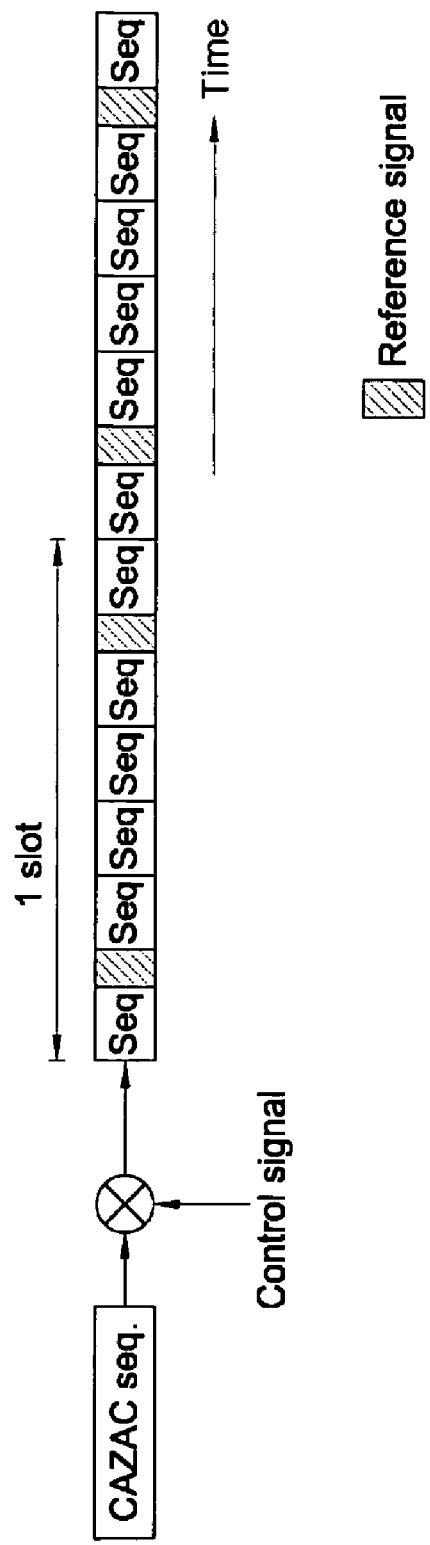
[Fig. 10]

[Fig. 11]
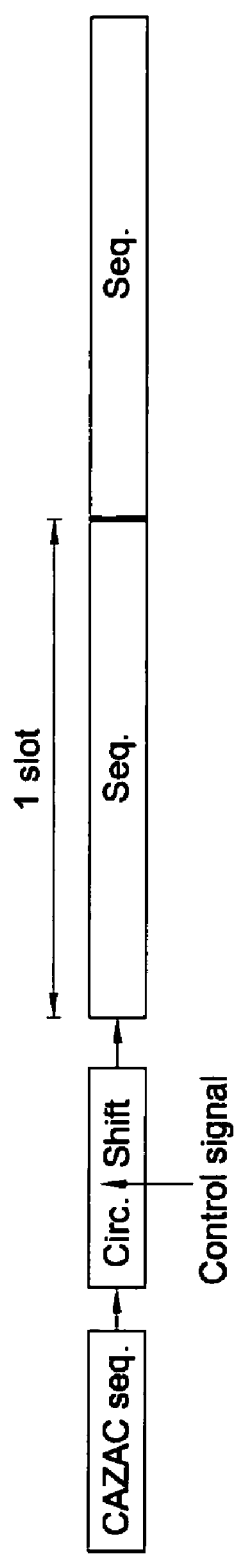

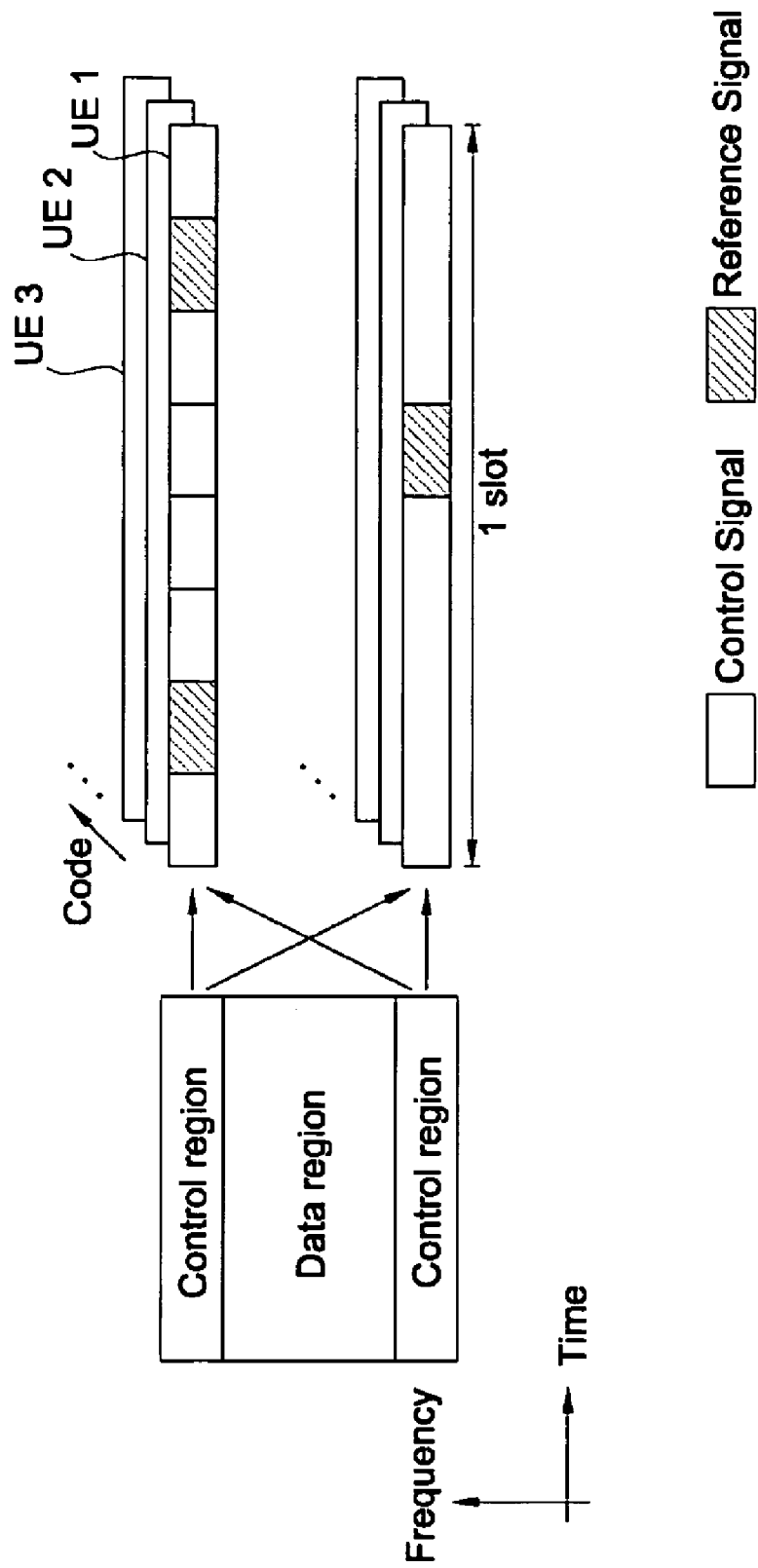
[Fig. 12]

[Fig. 13]
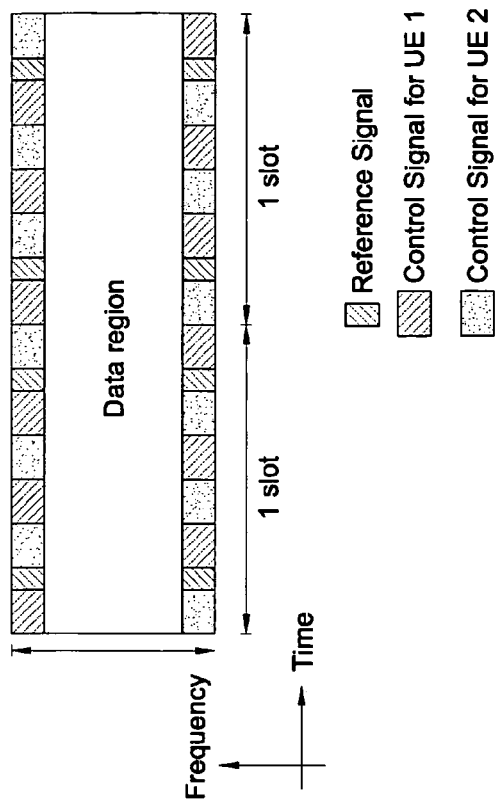
[Fig. 14]
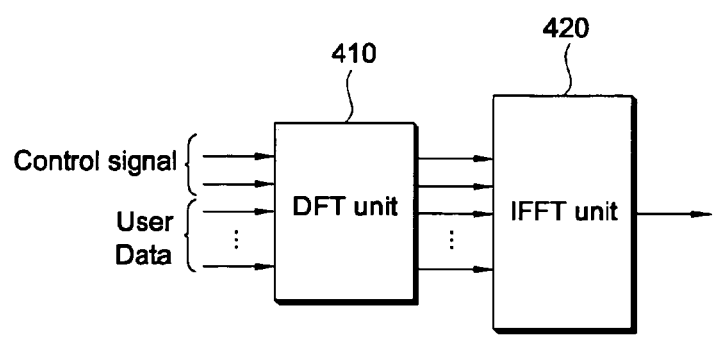
[Fig. 15]
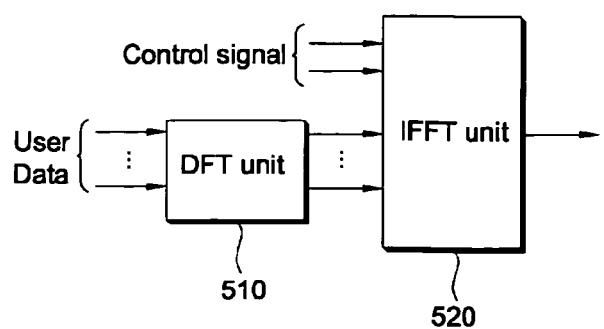

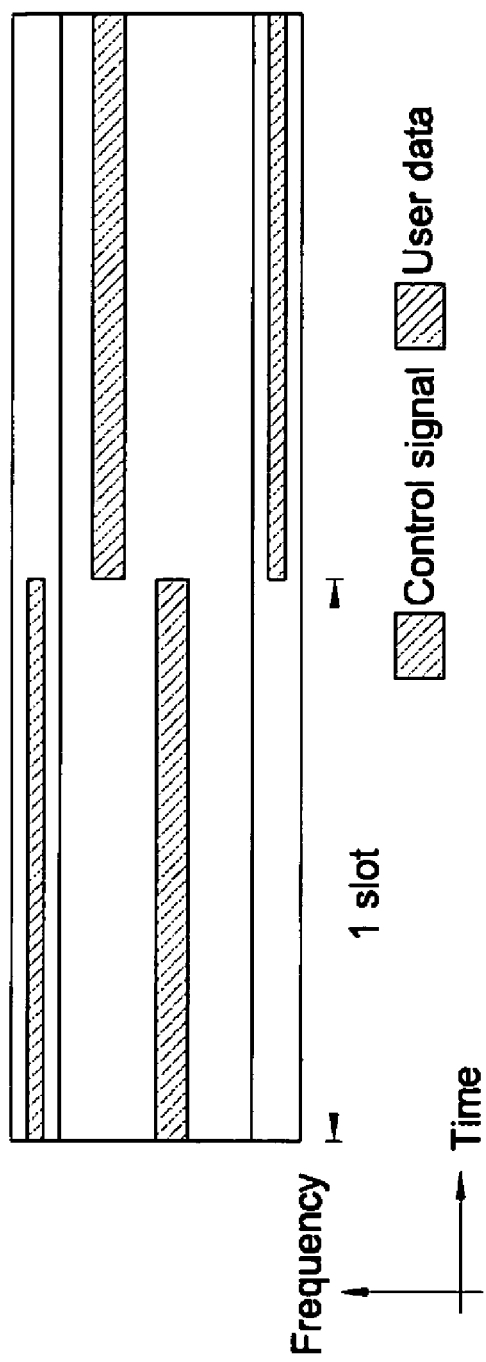
[Fig. 16]

[Fig. 17]
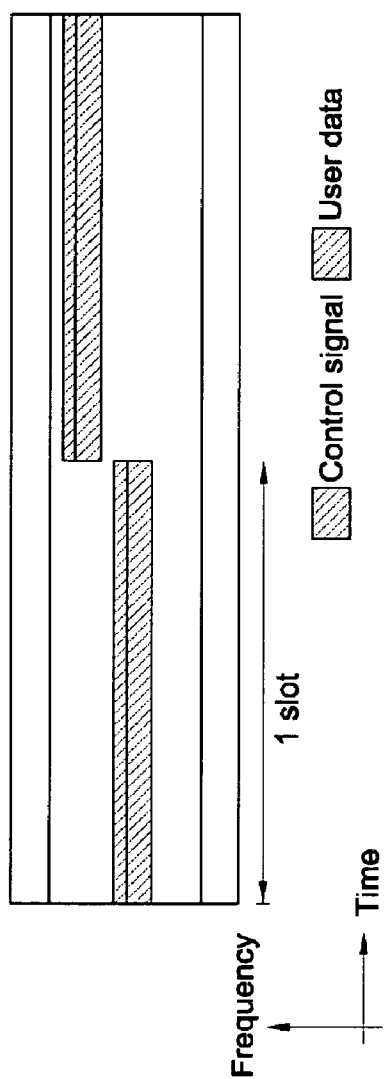
[Fig. 18]
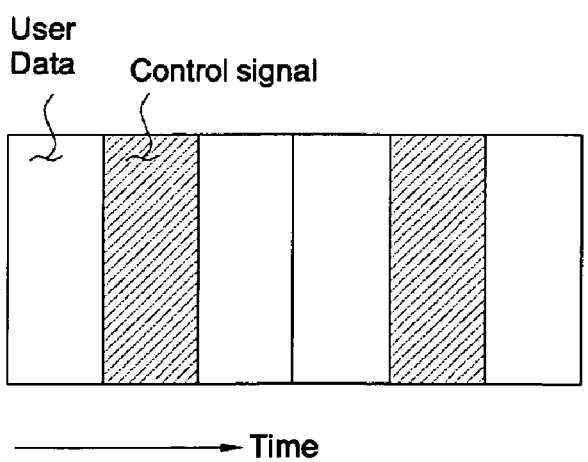

[Fig. 19]
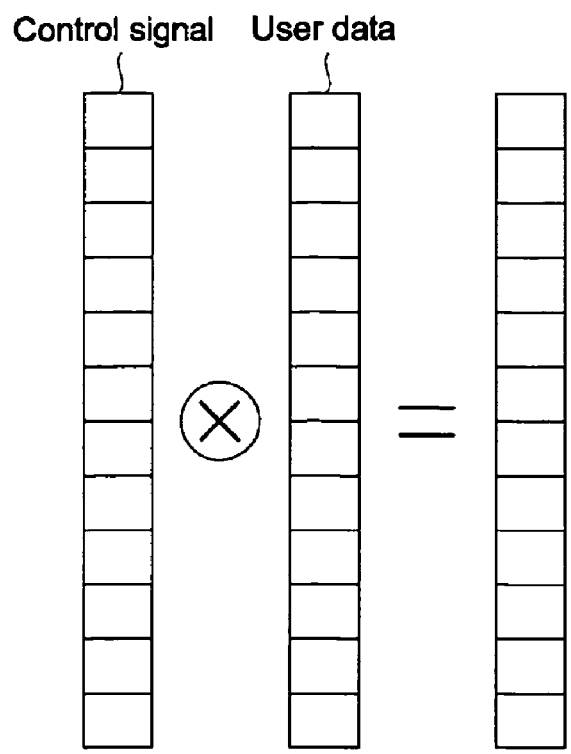
[Fig. 20]
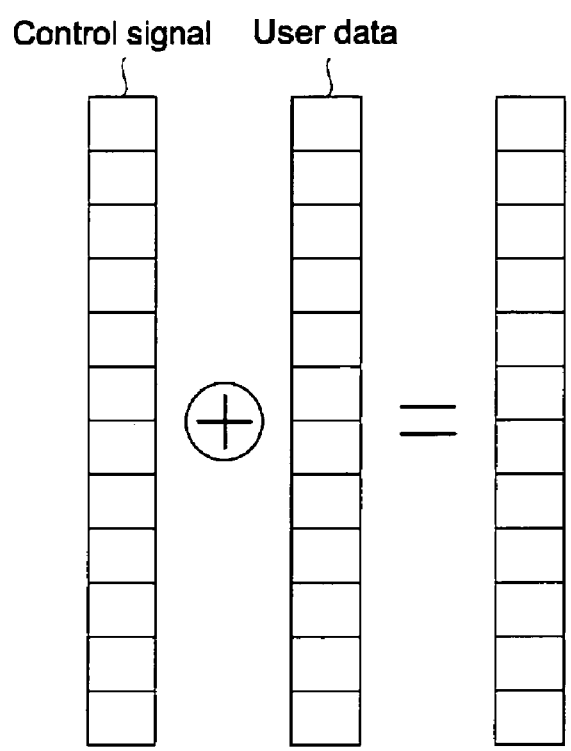

METHOD FOR TRANSMITTING CONTROL SIGNAL

This application is a 35 U.S.C. 371 National Stage entry of International Application No. PCT/KR20071005104, filed on Oct. 18, 2007, and claims the benefit of U.S. Provisional Application No. 60/862,152, filed on Oct. 19, 2006 and Korean Application No. KR 10-2007-0069415, filed on Jul. 11, 2007 which is hereby incorporated by reference in its entirety.

TECHNICAL FIELD

The present invention relates wireless communications, and more particularly, to a method of transmitting a control signal in a wireless communication system.

BACKGROUND ART

A third Generation Partnership Project (3GPP) mobile communication system based on a Wideband Code Division Multiple Access (WCDMA) radio access technology has widely deployed all over the world. High Speed Downlink Packet Access (HSDPA), which can be defined as the first evolution stage of the WCDMA, provides the 3GPP mobile communication system with high competitiveness in the midterm future. However, since the requirements and expectations of users and service providers continuously increase and the development of a competing radio access technology is in progress, there is a need for a new technology evolution in the 3GPP for further competitiveness.

One of systems that are considered in the post third-generation systems is an Orthogonal Frequency Division Multiplexing (OFDM) system which can attenuate an Inter-Symbol Interference (ISI) with low complexity. In the OFDM system, pieces of data that are input in series are transformed into N pieces of parallel data and then transmitted through N subcarriers. The subcarriers have orthogonality with each other. Orthogonal Frequency Division Multiple Access (OFDMA) refers to a multiple access scheme of realizing multiple access by independently providing each user with part of subcarriers.

One of the major problems of the OFDM/OFDMA system lies in that Peak-to-Average Power Ratio (PAPR) can be very high. The PAPR problem is that the peak amplitude of a transmit signal is very higher than a mean amplitude. It has its origin in that an OFDM symbol is constructed by overlapping N sinusoidal signals on different subcarriers. The PAPR is related to the capacity of the battery and problematic in user equipment sensitive to power consumption. To reduce power consumption, it is necessary to lower the PAPR.

One of systems that have been proposed to lower the PAPR is Single Carrier-Frequency Division Multiple Access (SC-FDMA). The SC-FDMA is of a type in which Frequency Division Multiple Access (FDMA) is combined with a Single Carrier-Frequency Division Equalization (SC-FDE). The SC-FDMA has a similar characteristic to that of OFDMA in that data is modulated and demodulated in time domain and frequency domain by employing Discrete Fourier Transform (DFT), but is advantageous in transmission power saving because the PAPR of a transmit signal can be lowered. In particular, it can be said that SC-FDMA is advantageous in uplink direction in which communication is performed from a user equipment to a base station, which is sensitive to transmission power in relation to the battery capacity of the user equipment.

Important things when the user equipment transmits data to the base station are small bandwidth and wide coverage. The SC-FDMA system has wider coverage than that of other system when using the same power amplifier is provided.

Data includes user data and a control signal concerned with the user data. A transmitter can transmit only the control signal and can also transmit the user data and the control signal by multiplexing them. If transmission of the control signal is failed, a receiver does not know even whether user data has been sent. Accordingly, transmission of the control signal requires high reliability.

Since radio resources used for transmitting the control signal may limit data rate, it is better that radio resources necessary for transmitting the control signal are small. Also, a number of terminals exist within one cell. It is therefore necessary for a base station to identify a user equipment which has sent the control signal.

There is a need for a method of allowing a user equipment to transmit a control signal to a base station with high reliability.

DISCLOSURE OF INVENTION

Technical Problem

An object of the present invention is to provide a method of transmitting a control signal in uplink direction.

Another object of the present invention is to provide a method of multiplexing of a control signal and user data.

Technical Solution

In one aspect, there is provided a method of enabling a user equipment to transmit a control signal to a base station. The method includes allocating a control signal to a control region on a subframe, the subframe comprising the control region for the control signal and a data region for user data, wherein different frequency bands within the control region are allocated to different user equipments, and transmitting the subframe in uplink direction.

In another aspect, a method includes allocating a control signal to a data region on a subframe by multiplexing the control signal and user data, the subframe comprising a control region only for transmitting the control signal and the data region and transmitting the subframe in uplink direction.

ADVANTAGEOUS EFFECTS

A control signal can be robustly transmitted under variance of channel condition. Both a control signal and user data can be transmitted efficiently under limited radio resources through multiplexing of the control signal and the user data.

BRIEF DESCRIPTION OF THE DRAWINGS

FIG. 1 is a view illustrating a wireless communication system.

FIG. 2 is a block diagram of a transmitter according to an embodiment of the present invention.

FIG. 3 is a block diagram of a SC-FDMA modulation unit.

FIG. 4 is a block diagram of a receiver according to an embodiment of the present invention.

FIG. 5 illustrates an example of a radio frame.

FIG. 6 illustrates an example of a subframe.

FIG. 7 illustrates a control channel format employing FDM method.

FIG. 8 illustrates an example of a control channel.

FIG. 9 illustrates another example of a control channel.

FIG. 10 illustrates still another example of a control channel.

FIG. 11 illustrates still another example of a control channel.

FIG. 12 illustrates a control channel format employing CDM method.

FIG. 13 illustrates an example of a frequency hopping pattern on a subframe.

FIG. 14 is a block diagram illustrates an example in which user data and the control signal are multiplexed.

FIG. 15 is a block diagram illustrates another example in which user data and a control signal are multiplexed.

FIG. 16 illustrates an example in which a control signal is allocated to a control region.

FIG. 17 illustrates an example in which a control signal is allocated to a data region.

FIG. 18 illustrates an example in which a control signal and user data are time-division multiplexed.

FIG. 19 illustrates multiplexing of a control signal and user data through multiplication operation.

FIG. 20 illustrates multiplexing of a control signal and user data through addition operation.

MODE FOR THE INVENTION

FIG. 1 is a view illustrating a wireless communication system. The wireless communication system is disposed in order to provide a variety of communication services such as voice and packet data.

Referring to FIG. 1, a wireless communication system includes a user equipment (UE) 10 and a base station (BE) 20. The user equipment 10 can be fixed or mobile and may also be called other terms such as a Mobile Station (MS), a User Terminal (UT), a Subscriber Station (SS) and a wireless device. The base station 20 generally refers to a fixed station that communicates with the user equipment 10 and may also be called other terms such as a node-B, a Base Transceiver System (BTS) and an access point. One or more cells may exist in one base station 20.

Hereinafter, downlink refers to communication from the base station 20 to the user equipment 10, and uplink refers to communication from the user equipment 10 to the base station 20. In downlink direction, a transmitter can be part of the base station 20 and a receiver can be part of the user equipment 10. In uplink direction, a transmitter can be a part of the user equipment 10 and a receiver can be a part of the base station 20.

Multiple access schemes for downlink and uplink transmission may differ. For example, downlink transmission may use OFDMA and uplink transmission may use SC-FDMA.

FIG. 2 is a block diagram of a transmitter according to an embodiment of the present invention.

Referring to FIG. 2, the transmitter 100 includes a data processing unit 110, a SC-FDMA modulation unit 120, a control unit 130, a Radio Frequency (RF) unit 140 and a transmit antenna 150.

The data processing unit 110 converts input information bit into a data symbol. The data processing unit 110 performs channel-coding and constellation-mapping the information bit and outputs the data symbol. The information bit includes user data to be sent to a receiver. The information bit may also include a control signal related to transmission of user data or allocation of radio resources.

The SC-FDMA modulation unit 120 modulates the data symbol using a SC-FDMA modulation method. The control signal can be modulated separately from the user data and then input to the SC-FDMA modulation unit 120. The SC-FDMA modulation unit 120 spreads the data symbol through Discrete Fourier Transform (DFT) and then performs Inverse Fast Fourier Transform (IFFT) on the DFT-performed data symbol.

The control unit 130 controls the operations of the data processing unit 110 and the SC-FDMA modulation unit 120. The RF unit 140 converts an input symbol into a radio signal. The radio signal is transmitted through the transmit antenna 150.

FIG. 3 is a block diagram of the SC-FDMA modulation unit.

Referring to FIG. 3, a SC-FDMA modulation unit 120 includes a DFT unit 121 that performs DFT, a subcarrier mapper 122 and an IFFT unit 123 that performs IFFT.

The DFT unit 121 performs DFT on an input data and outputs a frequency domain symbol. The data input to the DFT unit 121 may include a control signal and/or user data. The subcarrier mapper 122 allocates the input signal to each subcarrier according to various mapping methods. The IFFT unit 123 performs IFFT on the input symbol and outputs a transmit (Tx) signal. The transmit signal is a time domain signal. The time domain symbol output through the IFFT unit 123 is called an OFDM symbol. Alternatively, the time domain symbol output through the IFFT unit 123 is also called a SC-FDMA symbol because the OFDM symbol undergoes DFT before undergoing IFFT.

A method of modulating by combining DFT and IFFT is called SC-FDMA. This method is advantageous in that it can lower the PAPR when compared with OFDM. This is because it has characteristics of a single carrier.

FIG. 4 is a block diagram of the receiver according to an embodiment of the present invention.

Referring to FIG. 4, a receiver 200 includes a RF unit 210, a SC-FDMA demodulation unit 220, a data processing unit 230 and a control unit 240.

The RF unit 210 converts a signal, received from a receiver antenna 250, into a digitalized signal. The SC-FDMA demodulation unit 220 performs reverse-operation corresponding to the SC-FDMA modulation unit 120 in the digitalized signal, and outputs a data symbol. The data processing unit 230 recovers an information bit from the data symbol. The control unit 240 controls the processing process of the SC-FDMA demodulation unit 220 and the data processing unit 230.

FIG. 5 illustrates an example of a radio frame.

Referring to FIG. 5, a radio frame is comprised of 10 subframes. The subframe is a unit for allocating radio resources. One subframe may include two slots. One slot may include a plurality of OFDM symbols. One slot may include 7 or 6 OFDM symbols.

The format of the radio frame is only illustrative. The number of subframes included in the radio frame, the number of the slots included in the subframe, and the number of the OFDM symbols included in the slot can be changed in various ways.

FIG. 6 illustrates an example of a subframe. It may represent an uplink subframe.

Referring to FIG. 6, a subframe can be divided into two parts of a control region and a data region. The control region is a region in which only a control signal is transmitted and is allocated to a control channel. The data region is a region in which data is transmitted and is allocated to a data channel. The control channel is a channel for transmitting a control signal, and the data channel is a channel for transmitting the user data, or the user data and the control signal. The control channel and the data channel can be comprised of one subframe. The control signal may include various kinds of signals, such as Acknowledgement (ACK)/Negative-Acknowledgement (NACK) signals, a Channel Quality Indicator (CQI), a Precoding Matrix Index (PMI) and a Rank Indicator (RI), not user data.

Only the control signal is transmitted through the control region, but both the user data and the control signal can be transmitted through the data region. In other words, when a user equipment transmits only the control signal, the control region is allocated. When a user equipment transmits both the user data and the control signal, the data region can be allocated. As an exceptional case, when the amount of a control signal is great or a control signal is inappropriate for transmission through the control region, the data region can be allocated to the control signal.

Since the control region and the data region use different frequency bands, it may be called FDM (Frequency Division Multiplexing). The control region is positioned on both edges of system bandwidth and the data region is positioned at the center of the system bandwidth. However, this is only illustrative, and the control region and the data region on the subframe are not limited to the above positions. The positions of the control region and the data region can be changed and not limited to the form shown in the drawing.

In view of one user equipment, every slot per one subframe can be divided into two parts in the frequency domain. Assuming that one subframe consists of a first slot and a second slot, the first slot can be divided into a first region and a second region in the frequency domain, and the second slot may also be divided into a first region and a second region in the frequency domain. Assuming that a control signal is transmitted through the first region of the first slot and user data is transmitted through the second region of the first slot, the control signal is transmitted through the first region of the second slot and the user data is transmitted through the second region of the first slot. Although both the first region and the second region can be allocated to the control signal, one user equipment does not use same resource regions over two slots.

A slot allocated to each user equipment may use frequency hopping on a subframe. That is, one of two slots included in one subframe can be allocated to a frequency band on one side and the other of the two slots can be allocated to a frequency band on the other side so that they are juxtaposed. Since a control channel for the user equipment is transmitted through slots allocated to different frequency bands, frequency diversity gain can be obtained.

When a plurality of user equipments exist within a cell, a base station must send downlink control signals to the plurality of user equipments and each user equipment must send an uplink control signal to the base station. In order to transmit the uplink control signal, radio resources must be allocated every user equipment. For clarify, only uplink transmission in which the user equipment transmits the control signal to the base station is below described as an example.

<Transmission of a Control Signal>

When only a control signal is transmitted, the control signal is transmitted through the control region allocated to each user equipment. After a specific radio resource (that is, the control region) is allocated, a user equipment sends the control signal through the specific radio resource. A channel allocated to the control region in order to transmit the control signal is called a control channel.

On the control channel, user equipments can be identified by using Code Division Multiplexing (CDM) employing inter-code orthogonality or Frequency Division Multiplexing (FDM) employing inter-frequency orthogonality. The control signal can be transmitted through direct modulation or sequence mapping.

FIG. 7 illustrates a control channel format employing a FDM (Frequency Division Multiplexing) method.

Referring to FIG. 7, a plurality of user equipments uses control channels allocated to different frequency bands on the control region in order to send its control signal. The control region is divided into a plurality of frequency bands and a frequency band is allocated to the control channel for each user equipment. For an example, when the control region is divided into N frequency bands, 2N control channels are allocated to 2N user equipments.

Although the control channel is allocated to one of two control regions, the control channel may be allocated over two control regions so as to obtain diversity gain.

FIG. 8 illustrates an example of a control channel.

Referring to FIG. 8, a control signal is directly modulated on a control channel. Assuming that eight OFDM symbols constitute one slot, the control signal is allocated to six OFDM symbols and reference signals are allocated to the remaining two OFDM symbols. The reference signal is a signal previously known to both a transmitter and a receiver, and is used for channel estimation or data demodulation. The length of the two OFDM symbols to which the reference signal is allocated (indicated by oblique lines) may be shorter than that of the OFDM symbol to which the control signal is allocated.

The number of the OFDM symbols included in one slot is only illustrative, but not limited to. Also, the number of the OFDM symbols to which the reference signal is allocated or the position of the OFDM symbol to which the reference signal is allocated is illustrative.

FIG. 9 illustrates another example of a control channel.

Referring to FIG. 9, a control signal and reference signals are multiplexed on an OFDM symbol. The reference signals and the control signal may be arbitrarily multiplexed in a plurality of subcarriers constituting the OFDM symbol.

FIG. 10 illustrates still another example of a control channel.

Referring to FIG. 10, a control signal is mapped to a sequence and then allocated to a control channel. The sequence corresponding to the control signal is allocated to the control channel. For example, the sequence may be a Constant Amplitude Zero Auto-Correlation (CAZAC) sequence, a Hardamard sequence, a Walsh code or Golay sequence. The sequence has good self-correlation characteristic. When the number of subcarriers is sufficiently large, cell coverage can be increase by employing the CAZAC sequence.

In a Zadoff-Chu (ZC) sequence, which is one of CAZAC sequences, a k-th element P(k) of ZC sequence having a root index M can be represented as shown $$P(k) = \exp\left\{-\frac{j\pi Mk(k+1)}{N}\right\} \text{ for } N \text{ odd}$$

$$P(k) = \exp\left\{-\frac{j\pi Mk^2}{N}\right\} \text{ for } N \text{ even}$$

MathFigure 1 where N is the length of the ZC sequence and the root index M is a positive number smaller than N. The root index M is relatively prime to N.

The ZC sequence P(k) has the following three characteristics.

$$|P(k)| = 1 \text{ for all } k, N, M \quad \text{MathFigure 2}$$

$$R_{M;N}(d) = \begin{cases} 1, & \text{for } d = 0 \\ 0, & \text{for } d \neq 0 \end{cases} \quad \text{MathFigure 3}$$

$$R_{M_1,M_2;N}(d) = const \text{ for all } M_1, M_2 \quad \text{MathFigure 4}$$

Equation 2 means that the magnitude of the ZC sequence is always 1. Equation 3 means that auto correlation of the ZC sequence is represented as Dirac-delta function. Auto correlation is based on circular correlation. Equation 4 means that cross correlation is always constant.

The ZC sequence may be generated in time domain or frequency domain. IFFT may be performed in order to transform frequency domain ZC sequence the time domain ZC sequence.

The CAZAC sequence has orthogonality when it has a different root index or different cyclic shift on the same root index. Thus, various control signals may be allocated to the control channel by differentiating a root index or a cyclic shift. Alternatively, inter-user equipment or inter-cell control channel can be determined by differentiating an index or performing cyclic shift.

FIG. 11 illustrates still another example of a control channel.

Referring to FIG. 11, one CAZAC sequence is allocated to allocated resources without matching length of the CAZAC sequence to OFDM symbols. For example, the CAZAC sequence can be allocated to one slot.

When the length of the CAZAC sequence is matched with the OFDM symbols, the number of CAZAC sequences can be reduced and correlation between CAZAC sequences is increased. Thus, if long CAZAC sequence is available, correlation can be reduced and spreading gain can be obtained.

Although the control signal is mapped to the CAZAC sequence by employing the cyclic shift, this is only illustrative. User equipments are identified by using different cyclic shifts.

FIG. 12 illustrates a control channel employing CDM (Code Division Multiplexing) method. Respective user equipments use control channels to which different codes are assigned. Specific sequences are separately allocated to the control region by each user-equipment. The sequences are orthogonal to each other.

Referring to FIG. 12, in an upper control region, a control signal is allocated to 6 OFDM symbols with respect to one slot including 8 OFDM symbols. Reference signals are allocated to remaining 2 OFDM symbols. In a lower control region, one sequence which is mapped to a control signal is allocated to OFDM symbols in order to apply longer sequence per one slot.

The size or number of the OFDM symbols to which the reference signal is allocated is illustrative, but not limited to. If channel is estimated by using the reference signals, gain exists since the number of cyclic shift available to the CAZAC sequence is increased.

The format of the control channel is illustrative. The upper and lower control regions may have the same structure. The format of the control channel may be varied depending on time.

When CAZAC sequence is used in order to identify user equipments, the orthogonality between the user equipments has to be maintained by allocating different root indices of the CAZAC sequence to the respective user equipments. Alternatively, the orthogonality between the user equipments can be maintained by allocating different cyclic shifts.

Various methods may be used in order to transmit a control signal on a control channel. A method of directly modulating and transmitting the control signal may be adopted or a method of mapping the control signal to a sequence and sending the sequence may be adopted.

FIG. 13 illustrates an example of a frequency-hopping pattern on a subframe.

Referring to FIG. 13, frequency hopping is performed on control signals for two user equipments per OFDM-symbol basis. By performing OFDM symbol based frequency hopping, time diversity gain can be obtained.

One slot includes eight OFDM symbols. Control signals for two user equipments are alternately allocated to six OFDM symbols. The reference signals are allocated to two OFDM symbols. The number of the OFDM symbols included in one slot, and the number or position of the OFDM symbols used for the reference signals are only illustrative, but not limited to.

A plurality of OFDM symbols may be used as an unit for performing frequency hopping. Radio resources defined as the length of an allocated sequence may be defined as a basic unit.

Not only a frequency diversity gain, but also a time diversity gain can be obtained by performing a number of frequency hopping on a subframe.

<Transmission of a Control Signal Along with User Data>

Both user data and a control signal are transmitted through a data region. In order to multiplex the user data and the control signal, two methods are possible. The first method is a method of performing DFT spreading both the control signal and the user data and then performing IFFT. The second method is a method of performing DFT spreading only the user data and then performing IFFT on both the user data and the control signal.

FIG. 14 is a block diagram illustrates an example in which user data and a control signal are multiplexed.

Referring to FIG. 14, both user data and a control signal are input to a DFT unit 410 and then undergo DFT. An IFFT unit 420 performs IFFT on the DFT-spreaded data.

FIG. 15 is a block diagram illustrates another example in which user data and a control signal are multiplexed.

Referring to FIG. 15, user data is input to a DFT unit 510 and then undergoes DFT. An IFFT unit 520 performs IFFT on a control signal and the DFT-spreaded user data.

The control signal can be input to the IFFT unit 520 in a localized form. That is, the control signal can be input to the IFFT unit 520 so that it occupies localized subcarriers. Alternatively, the control signal can be input to the IFFT unit 520 in a distributed fashion. The control signal can be input to the IFFT unit 520 so that it occupies distributed subcarriers.

The method of inserting the control signal before DFT can give good PAR and frequency diversity gain since single carrier characteristic maintains. On the contrary, the method of inserting the control signal after DFT can give poor PAPR since single carrier characteristic does not maintain, but give time diversity gain. When channel condition can accurately be estimated, coverage can be maximized by obtaining time diversity through good channel.

Meanwhile, when multiplexing a control signal and user data, the control signal can be allocated to a control region or a data region.

FIG. 16 illustrates an example in which a control signal is allocated to a control region.

Referring to FIG. 16, when multiplexing a control signal and user data, the control signal is allocated to a control region and the user data is allocated to a data region. This is efficient when the size of the control region is relatively large because the control signal is allocated to only the control region irrespective of whether it is multiplexed with the user data.

FIG. 17 illustrates an example in which a control signal is allocated to a data region.

Referring to FIG. 17, a data region is divided for a region for a control signal and a region for user data in frequency domain. This can achieve simple scheduling and reduce the size of a control region.

Multiplexing of a control signal and user data can adopt frequency division multiplexing. That is, the control signal and the user data allocated to different frequencies within a data region.

FIG. 18 illustrates an example in which a control signal and user data are time-division multiplexed.

Referring to FIG. 18, a control signal and user data are allocated to different radio resources in time domain.

In time division multiplexing or frequency division multiplexing, a control signal can be allocated after direct modulation or after being mapped to a sequence.

When the control signal is mapped to the sequence, it can be transmitted after performing an operation with user data.

FIG. 19 illustrates multiplexing of a control signal and user data through multiplication operation. FIG. 20 illustrates multiplexing of a control signal and user data through addition operation.

After a control signal is mapped to a sequence, the sequence can be added or multiplied to subcarriers to which user data is allocated. When the control signal is multiplied to the user data, the properties of a single carrier maintains, therefore, relatively low PAPR can be achieved.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. In a wireless communication system, a method of transmitting a control signal from user equipment to a base station, the method comprising:
   dividing, at the user equipment, the control signal into a first portion and a second portion; and
   transmitting the control signal to the base station, wherein the control signal is transmitted in a subframe, the subframe comprising a control region and a data region in the frequency domain, and a first slot and a second slot the time domain, the first portion of the control signal occupying a first frequency in the first slot and the second portion of the control signal occupying a second frequency in the second slot.

2. The method of claim 1, wherein the control region occupies an upper and a lower portion of a subframe bandwidth and the data region occupies a portion of the subframe bandwidth between the upper and lower portions.

3. The method of claim 2, wherein the frequencies in the data region are between the frequencies in the upper portion of the control region and lower portion of the control region.

4. The method of claim 1 further comprising: processing the control signal by a cycle shifted sequence.

5. The method of claim 4 further comprising:
   performing an Inverse Fast Fourier Transform (IFFI) on the processed control signal.

6. The method of claim 4, wherein the sequence is a CAZAC sequence.

7. The method of claim 6, wherein the CAZAC sequence is a Zadoff-Chu sequence.

8. The method of claim 1 further comprising:
   transmitting a control signal for each of a plurality of user equipment in the subframe.

9. The method of claim 8, wherein a first portion of the control signal for each of the plurality of user equipment occupies a corresponding frequency in the control region in the first slot, wherein the second portion of the control signal for each of the plurality of user equipment occupies a corresponding frequency in the control region in the second slot, and wherein the frequency associated with the first slot and the frequency associated with the second slot for each of the plurality of user equipment is at least separated by the frequencies in the data region.

10. The method of claim 9, wherein the control signal associated with at least one of the plurality of user equipment occupying a frequency in the data region.

11. In a wireless communication system, a method of transmitting a control signal from user equipment to a base station, the method comprising:
   mapping, at the user equipment, the control signal to a cycle shifted sequence;
   performing an Inverse Fast Fourier Transform (IFFI) on the mapped control signal; and
   transmitting the transformed, mapped control signal in a subframe, wherein the subframe includes a control region in the frequency domain, the control region including a first and a second time slot in the time domain, and wherein a first portion of the control signal is transmitted at a first frequency in the first time slot and a second portion of the control signal is transmitted at second, different frequency in the second time slot.

12. The method of claim 11, wherein the subframe further includes, in the frequency domain, a data region separate from the control region.

13. The method of claim 12, wherein the control region comprises a plurality of higher frequencies and a plurality of lower frequencies, which are lower than the plurality of higher frequencies, and wherein the data region comprises a plurality of frequencies that are lower than the plurality of higher frequencies in the control region and higher than the plurality of lower frequencies in the control region.

14. The method of claim 13, wherein the frequency used for transmitting the first portion of the control signal in the first time slot of the control region and the frequency used for transmitting the second portion of the control signal in the second time slot of the control region are at least separated by the frequencies in the data region.

15. The method of claim 11, wherein the cyclic shift of the sequence identifies the user equipment.

16. The method of claim 11, wherein the cyclic shift of the sequence identifies the control signal.

17. The method of claim 11, wherein the sequence is a CAZAC sequence.

18. The method of claim 17, wherein the sequence is a Zadoff-Chu sequence.

19. The method of claim 11, wherein at least one of the first and second time slots comprises a plurality of single carrier-frequency division multiple access (SC-FDMA) symbols.

20. The method of claim 19, wherein at least one SC-FDMA symbol is allocated to a reference signal and wherein the remaining SC-FDMA symbols are allocated to the control signal.

21. The method of claim 11, wherein the control signal is an acknowledgement (ACK)/negative-acknowledgement (NACK) signal or a channel quality indicator (CQI).

22. The method of claim 12 further comprising: transmitting a second control signal using a frequency in the data region.

23. In a wireless communications system, user equipment comprising:
a data processing unit configured to map a control signal to a cycle shifted sequence;
a modulation unit configured to perform an Inverse Fast Fourier Transform (IFFT) on the mapped control signal; and
a radio frequency unit and a transmit antenna configured to transmit the transformed, mapped control signal in a subframe, wherein the subframe comprises a control region in the frequency domain, wherein the control region comprises a first slot and a second slot in the time domain, and wherein a first portion of the control signal is transmitted at a first frequency in the first slot and a second portion of the control signal is transmitted at second, different frequency in the second slot.

24. The method of claim 23, wherein the subframe further includes, in the frequency domain, a data region separate from the control region.

25. The user equipment of claim 24, wherein the control region comprises a plurality of higher frequencies and a plurality of lower frequencies, which are lower than the plurality of higher frequencies, and wherein the data region comprises a plurality of frequencies that are lower than the plurality of higher frequencies in the control region and higher than the plurality of lower frequencies in the control region.

26. The user equipment of claim 25, wherein the frequency used for transmitting the first portion of the control signal in the first slot of the control region and the frequency used for transmitting the second portion of the control signal in the second slot of the control region are at least separated by the frequencies in the data region.

27. The user equipment of claim 23, wherein the cyclic shift of the sequence identifies the user equipment.

28. The user equipment of claim 23, wherein the cyclic shift of the sequence identifies the control signal.

29. The user equipment of claim 23, wherein the sequence is a CAZAC sequence.

30. The user equipment of claim 29, wherein the sequence is a Zadoff-Chu sequence.

31. The user equipment of claim 23, wherein at least one of the first and second time slots comprises a plurality of single carrier-frequency division multiple access (SC-FDMA) symbols.

32. The user equipment of claim 31, wherein at least one SC-FDMA symbol is allocated to a reference signal and wherein the remaining SC-FDMA symbols are allocated to the control signal.

33. The user equipment of claim 23, wherein the control signal is an acknowledgement (ACK)/negative-acknowledgement (NACK) signal or a channel quality indicator (CQI).

34. The user equipment of claim 24, wherein the radio frequency unit and the transmit antenna are further configured to transmit a second control signal using a frequency in the data region.

* * * * *